(12) United States Patent
Thurfjell et al.

(10) Patent No.: US 11,456,788 B2
(45) Date of Patent: Sep. 27, 2022

(54) BEAM DIRECTION SELECTION FOR A RADIO COMMUNICATIONS DEVICE

(71) Applicant: Telefonaktiebolaget LM Ericsson (publ), Stockholm (SE)

(72) Inventors: Magnus Thurfjell, Luleå (SE); Henrik Asplund, Stockholm (SE); Jonas Medbo, Uppsala (SE); Peter Ökvist, Luleå (SE); Nima Seifi, Solna (SE); Arne Simonsson, Gammelstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 708 days.

(21) Appl. No.: 16/318,053

(22) PCT Filed: Jul. 15, 2016

(86) PCT No.: PCT/SE2016/050723
§ 371 (c)(1),
(2) Date: Jan. 15, 2019

(87) PCT Pub. No.: WO2018/013024
PCT Pub. Date: Jan. 18, 2018

(65) Prior Publication Data
US 2021/0270927 A1    Sep. 2, 2021

(51) Int. Cl.
*H04B 7/06* (2006.01)
*H01Q 3/24* (2006.01)
(Continued)

(52) U.S. Cl.
CPC ............ *H04B 7/0617* (2013.01); *G01S 3/043* (2013.01); *G01S 3/52* (2013.01); *H01Q 3/24* (2013.01);
(Continued)

(58) Field of Classification Search
None
See application file for complete search history.

(56) References Cited

U.S. PATENT DOCUMENTS

| 2013/0210474 A1* | 8/2013 | Kyosti | ................ H04B 17/102 455/517 |
| 2014/0105054 A1* | 4/2014 | Sægrov | ................ G01S 5/0072 370/252 |
| 2015/0326297 A1 | 11/2015 | Petersson et al. | |

FOREIGN PATENT DOCUMENTS

| EP | 2627015 A2 | 8/2013 |
| TW | 201141101 A | 11/2011 |
| WO | 2012158045 A1 | 11/2012 |

OTHER PUBLICATIONS

TW201141101 translation (Year: 2011).*
(Continued)

*Primary Examiner* — Whitney Moore
(74) *Attorney, Agent, or Firm* — Sage Patent Group

(57) ABSTRACT

Mechanisms for selecting beam direction for a radio communications device are provided. A method is performed by the radio communications device. The method includes obtaining radio channel estimates of a radio channel on which radio waves have been transmitted between the radio communications device and another radio communications device at an angle of arrival and departure. The method includes determining a Doppler shift from the radio channel estimates. The method includes estimating at least one of the angle of arrival and departure of the radio waves based on the Doppler shift. The method includes selecting a beam direction for a signal to be transmitted between the radio communications device and this another radio communications device over the radio channel according to the estimated angle of arrival or departure.

16 Claims, 4 Drawing Sheets

(51) Int. Cl.
*H01Q 21/28* (2006.01)
*H04B 7/0456* (2017.01)
*G01S 3/04* (2006.01)
*G01S 3/52* (2006.01)

(52) U.S. Cl.
CPC ........... *H01Q 21/28* (2013.01); *H04B 7/0456* (2013.01); *H04B 7/0608* (2013.01)

(56) References Cited

OTHER PUBLICATIONS

International Search Report and Written Opinion dated Apr. 7, 2017 for International Application No. PCT/SE/2016/050723 filed on Jul. 15, 2016, consisting of 9-pages.
International Preliminary Report on Patentability dated Jan. 15, 2019 for International Application No. PCT/SE/2016/050723 filed on Jul. 15, 2016, consisting of 7-pages.
First Chinese Office Action for Chinese Patent Application No. CN 201680089204.4 dated Sep. 13, 2021, 12 pages.

* cited by examiner

BEAM DIRECTION SELECTION FOR A RADIO COMMUNICATIONS DEVICE

CROSS-REFERENCE TO RELATED APPLICATIONS

This application is a Submission Under 35 U.S.C. § 371 for U.S. National Stage Patent Application of International Application Number: PCT/SE2016/050723, filed Jul. 15, 2016 entitled "BEAM DIRECTION SELECTION FOR A RADIO COMMUNICATIONS DEVICE," the entirety of which is incorporated herein by reference.

TECHNICAL FIELD

Embodiments presented herein relate to a method, a radio communications device, a computer program, and a computer program product for selecting beam direction for the radio communications device.

BACKGROUND

In communications systems, there may be a challenge to obtain good performance and capacity for a given communications protocol, its parameters and the physical environment in which the communications systems is deployed.

For example, future generation wireless communications systems are expected to provide ubiquitous high data-rate network coverage. Currently emerging standards, such as the 3rd Generation Partnership Project (3GPP) Long Term Evolutional Advanced (LTE-Advanced), are targeted to support up to 1 Gbps in the downlink (i.e., from the network nodes to the wireless devices) and 500 Mbps in the uplink (i.e., from the wireless devices to the network nodes). In general terms, achieving such data rates requires an efficient use of the available resources and typically requires large frequency bandwidths to be used which may be more available at carrier frequencies higher than at about the 6 GHz frequency bandwidth commonly used in existing wireless communication systems. Further if time division duplex (TDD) access is used reciprocity between properties of the radio channel for downlink transmission (i.e. transmission from serving network node to served wireless device) and properties of the radio channel for uplink transmission (i.e. transmission from served wireless device to serving network node) can be utilized.

If high frequencies are used network coverage could be a challenge. For uplink transmission, in certain scenarios transmit beam forming could be necessary to achieve sufficient network coverage.

In general terms, methods for selecting beam and setting beam weights (or pre-coder) transmit beam forming are based on either closed-loop approaches or open-loop approaches. Closed-loop approaches for the uplink are based on uplink measurements that are reported back from the network node to the wireless device. Open-loop approaches are based on utilizing the uplink/downlink reciprocity. Closed-loop approaches cost radio resources for feedback. Closed-loop approaches often require sounding reference signals to be transmitted in uplink to get reliable uplink measurements. Closed-loop approaches also suffer from reporting delay. This reporting delay can be significant if the wireless device is moving.

Open-loop approaches require that the same antennas are used in the wireless device for both transmission and reception. However, device implementations are sometimes done with separate transmit and receive antennas, as this can e.g. remove the need for components such as splitters, combiners, duplex filters, etc. If there are a larger number of receive antennas this cannot easily improve the beam forming accuracy.

Hence, there is still a need for an improved beam selection.

SUMMARY

An object of embodiments herein is to provide efficient beam direction selection.

According to a first aspect there is presented a method for selecting beam direction for a radio communications device. The method is performed by the radio communications device. The method comprises obtaining radio channel estimates of a radio channel on which radio waves have been transmitted between the radio communications device and another radio communications device at an angle of arrival and departure. The method comprises determining a Doppler shift from the radio channel estimates. The method comprises estimating at least one of the angle of arrival and departure of the radio waves based on the Doppler shift. The method comprises selecting a beam direction for a signal to be transmitted between the radio communications device and this another radio communications device over the radio channel according to the estimated angle of arrival or departure.

According to a second aspect there is presented a radio communications device for selecting beam direction for the radio communications device. The radio communications device comprises processing circuitry. The processing circuitry is configured to cause the radio communications device to obtain radio channel estimates of a radio channel on which radio waves have been transmitted between the radio communications device and another radio communications device at an angle of arrival and departure. The processing circuitry is configured to cause the radio communications device to determine a Doppler shift from the radio channel estimates. The processing circuitry is configured to cause the radio communications device to estimate at least one of the angle of arrival and departure of the radio waves based on the Doppler shift. The processing circuitry is configured to cause the radio communications device to select a beam direction for a signal to be transmitted between the radio communications device and this another radio communications device over the radio channel according to the estimated angle of arrival or departure.

According to a third aspect there is presented a radio communications device for selecting beam direction for the radio communications device. The radio communications device comprises processing circuitry and a computer program product. The computer program product stores instructions that, when executed by the processing circuitry, causes the radio communications device to perform operations, or steps. The operations, or steps, cause the radio communications device to obtain radio channel estimates of a radio channel on which radio waves have been transmitted between the radio communications device and another radio communications device at an angle of arrival and departure. The operations, or steps, cause the radio communications device to determine a Doppler shift from the radio channel estimates. The operations, or steps, cause the radio communications device to estimate at least one of the angle of arrival and departure of the radio waves based on the Doppler shift. The operations, or steps, cause the radio communications device to select a beam direction for a signal to be transmitted between the radio communications device and this another radio communications device over the radio channel according to the estimated angle of arrival or departure.

According to a fourth aspect there is presented a radio communications device for selecting beam direction for the radio communications device. The radio communications device comprises an obtain module configured to obtain radio channel estimates of a radio channel on which radio waves have been transmitted between the radio communications device and another radio communications device at an angle of arrival and departure. The radio communications device comprises a determine module configured to determine a Doppler shift from the radio channel estimates. The radio communications device comprises an estimate module configured to estimate at least one of the angle of arrival and departure of the radio waves based on the Doppler shift. The radio communications device comprise a select module (210d) configured to select a beam direction for a signal to be transmitted between the radio communications device and this another radio communications device over the radio channel according to the estimated angle of arrival or departure.

According to a fifth aspect there is presented a computer program for selecting beam direction for a radio communications device, the computer program comprising computer program code which, when run on the radio communications device, causes the radio communications device to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

Advantageously this method, these radio communications devices, this computer program, and this computer program product provide efficient beam direction selection. One or more beams could then be selected from the selected beam, thus resulting in efficient beam selection.

Advantageously this method, these radio communications devices, this computer program, and this computer program product provide an efficient open-loop approach that is applicable to TDD as well as frequency division duplex (FDD).

Advantageously this method, these radio communications devices, this computer program, and this computer program product provide an efficient open-loop approach that is applicable even when transmit antennas and receive antennas at the radio communications device are different in number or configuration.

Advantageously this method, these radio communications devices, this computer program, and this computer program product can be applied in combination with existing beam forming methods to improve performance.

Advantageously this method, these radio communications devices, this computer program, and this computer program product is more efficient than open-loop approaches for moving radio communications devices.

It is to be noted that any feature of the first, second, third, fourth, fifth and sixth aspects may be applied to any other aspect, wherever appropriate. Likewise, any advantage of the first aspect may equally apply to the second, third, fourth, fifth and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
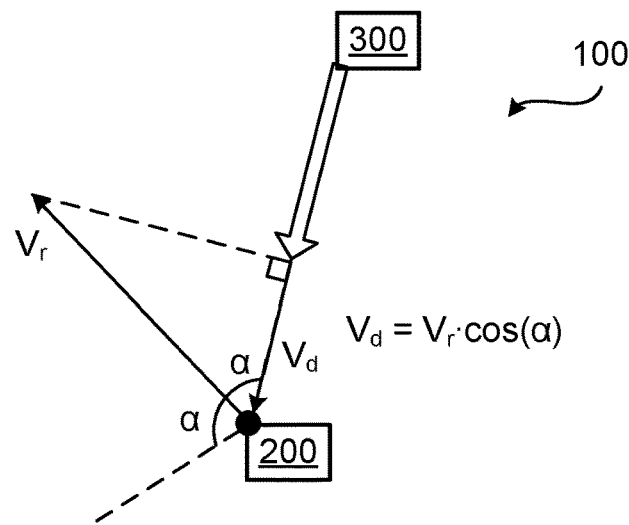
FIG. 1 is a schematic diagram illustrating a communications system according to embodiments.

FIG. 1 is a schematic diagram illustrating a communications system 100 where embodiments presented herein can be applied. The communications system 100 comprises a first radio communications device 200 and a second radio communications device 300. The radio communications devices 200, 300 are configured to communicate with each other over a radio channel.

One of the radio communications devices 200, 300 (for example, but not necessary, radio communications device 200) could be part of a wireless device, such as a portable wireless device, mobile station, mobile phone, handset, wireless local loop phone, user equipment (UE), smartphone, laptop computer, tablet computer, wireless modem, or network equipped sensor. The other of the radio communications devices 200, 300 (for example, but not necessary, radio communications device 300) could be part of a network node, such as a radio access network node, radio base station, base transceiver station, node B, evolved node B, access point, or access node.

The embodiments disclosed herein relate to mechanisms for selecting beam direction for the radio communications device 200. In order to obtain such mechanisms there is provided a radio communications device 200, a method performed by the radio communications device 200, a computer program product comprising code, for example in the form of a computer program, that when run on a radio communications device 200, causes the radio communications device 200 to perform the method.

In particular, the herein disclosed mechanisms for selecting beam direction for the radio communications device 200 are based on determining Doppler shift. An initial reference is therefore made to FIGS. 2 and 3 before proceeding further with the description of the embodiments.

Figure 2:
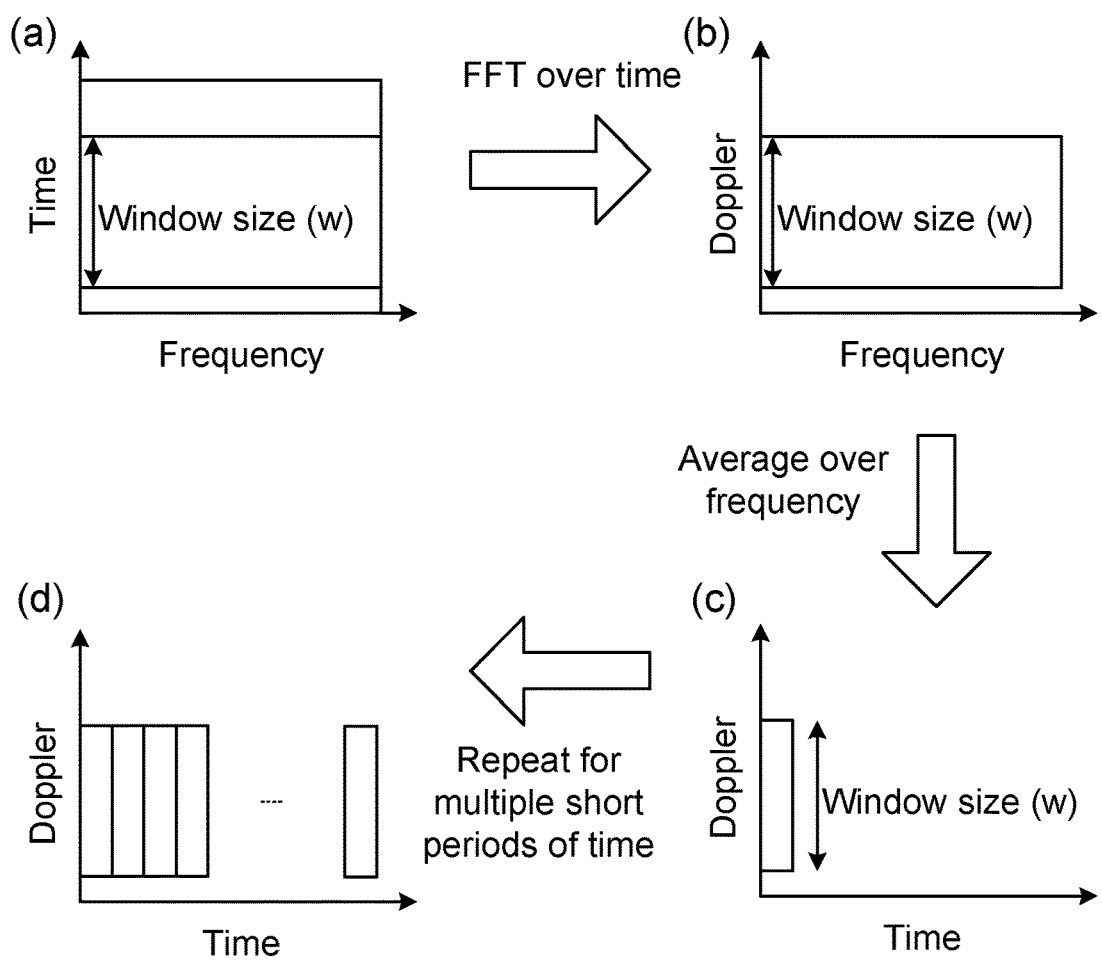
FIG. 2 schematically illustrates how to obtain a Doppler spectrum according to an embodiment.

FIG. 2 schematically illustrates how to obtain a Doppler spectrum according to an embodiment. In general terms the Doppler spectrum can be estimated by calculating a frequency transform, such as the fast Fourier transform (FFT), of radio channel estimates over a relatively short period in the time domain. In more detail, FIG. 2(*a*) schematically indicates a time-frequency diagram of the radio channel on which radio waves have been transmitted between the radio communications device 200 and the radio communications device 300. The FFT is determined for the time-frequency representation over time in a window of length w time units, resulting in the Doppler spectrum-frequency representation in FIG. 2(*b*). The Doppler spectrum-frequency representation is averaged over frequency, resulting in the average Doppler spectrum representation of FIG. 2(*c*). Alternatively, the Doppler spectrum in FIG. 2(*c*) may represent a single frequency of the Doppler spectrum-frequency representation in FIG. 2(*b*). This procedure is repeated for multiple short periods of time resulting in the time varying Doppler spectrum of FIG. 2(*d*). Hence, multiple Doppler shifts could be determined from a short-term frequency transform of a time series of the radio channel estimates.

Figure 3:
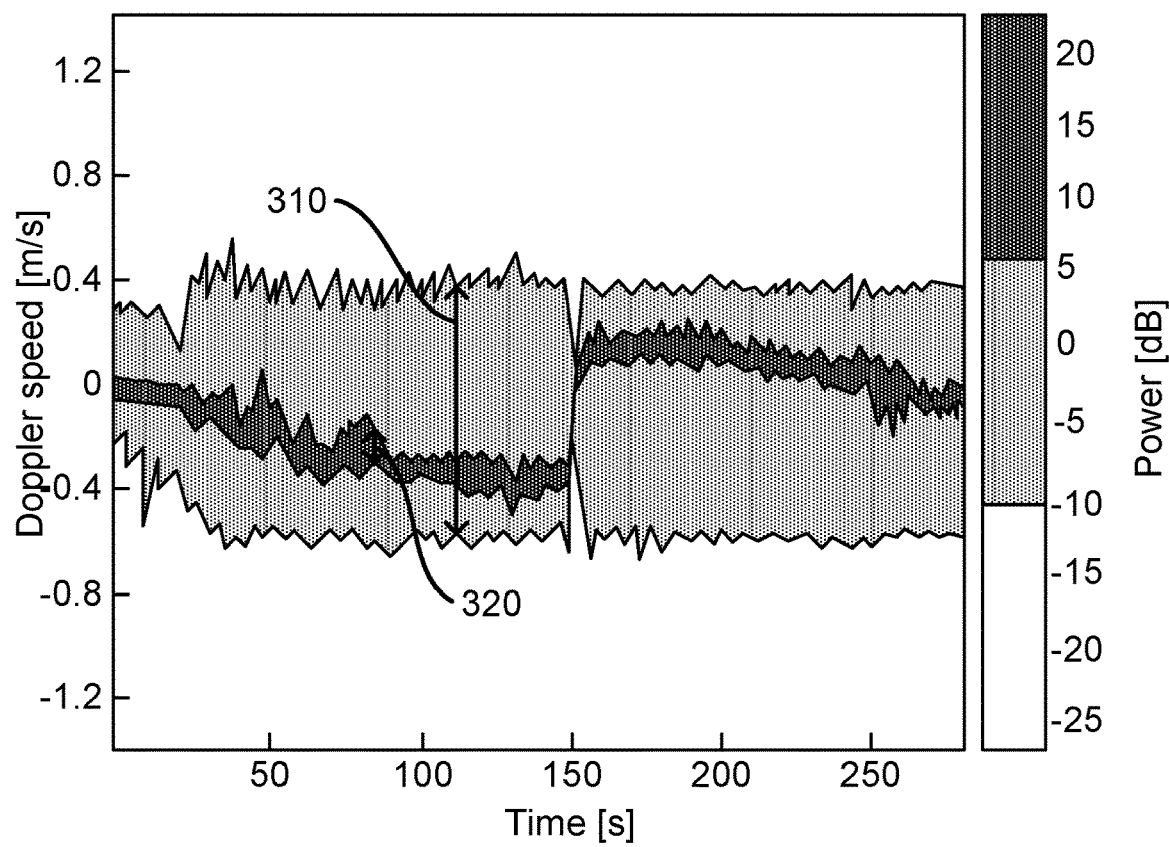
FIG. 3 schematically illustrates a Doppler spectrum according to an embodiment.

FIG. 3 shows an example time varying Doppler spectrum averaged over a 100 MHz bandwidth for 135 short period segments, where each short period segment is 2 seconds long, resulting in a total measurement route of 270 seconds. The time varying Doppler spectrum represents radio channel estimates of the radio channel on which radio waves have been transmitted between the radio communications device 200 and the radio communications device 300. During the first 15 seconds the radio communications device 200 is stationary (with respect to the radio communications device 300 and the surrounding environment) and the Doppler spread of the radio communications device 200 is close to 0. In this respect, multiple Doppler shifts correspond to the Doppler spread whereas one such Doppler shift corresponds to the Doppler speed. For example, assume that one Doppler shift has a frequency value denoted $f_d$ and that the wavelength of the radio waves is), then the Doppler speed $V_d$ can be determined as $V_d = f_d \cdot \lambda$.

Another term for Doppler speed is radial velocity of the radio communications device 200. In this respect, the Doppler speed is the radial velocity relative to the transmitter of the radio waves or relative to any mirrored version of the transmitter caused by reflections of the radio waves. The Doppler speed is the speed represented by the strongest Doppler shift in the Doppler spectrum. In general terms, the radial velocity varies as a function of the angle α between the line of sight (assuming that no reflected radio waves are stronger than the radio waves received along the line of sight) and the speed of the radio communications device 200. In the following the angle α will be denoted angle of arrival (AoA) or angle of departure (AoD).

With reference back to FIG. 1, assuming that the speed of the radio communications device 200 is $V_r$, then the radial velocity, defining the Doppler speed $V_d$, can be determined according to Eq. (1):

$$V_d = V_r \cdot \cos \alpha \qquad \text{Eq. (1)}$$

With reference again to FIG. 3, in the timer interval between 15 and 270 seconds, the radio communications device 200 moves with a constant speed, 0.5 m/s, which is seen as a spread 310 in one Doppler shift between about −0.5 and +0.5 m/s. This spread corresponds to the speed $V_r$ of the radio communications device 200. In the timer interval between 15 to 150 seconds the radio communications device 200 moves away from the radio communications device 300. The strongest path (corresponding to the dark part 320 in FIG. 3) is in this case the line-of-sight path and defines the Doppler speed $V_d$ (which thus is negative). The Doppler speed of this strongest path is increasingly negative corresponding to that the angle to the radio communications device 300 is decreasing relatively to the direction of the movement of the radio communications device 200. At 150 seconds, the radio communications device 200 turns back and moves towards the radio communications device 300 and the strongest line-of-sight path then has a positive Doppler speed. Regardless of whether the radio waves have been transmitted or received by the radio communications device 200, the strongest downlink path could also be the best path for uplink transmission, and vice versa. Thus if a beam direction is selected for uplink transmission it could be in the same direction as the seen strongest line-of-site path in FIG. 3. Particular details of how to select beam direction for the radio communications device 200 will be disclosed next.

Figures 4, 5:
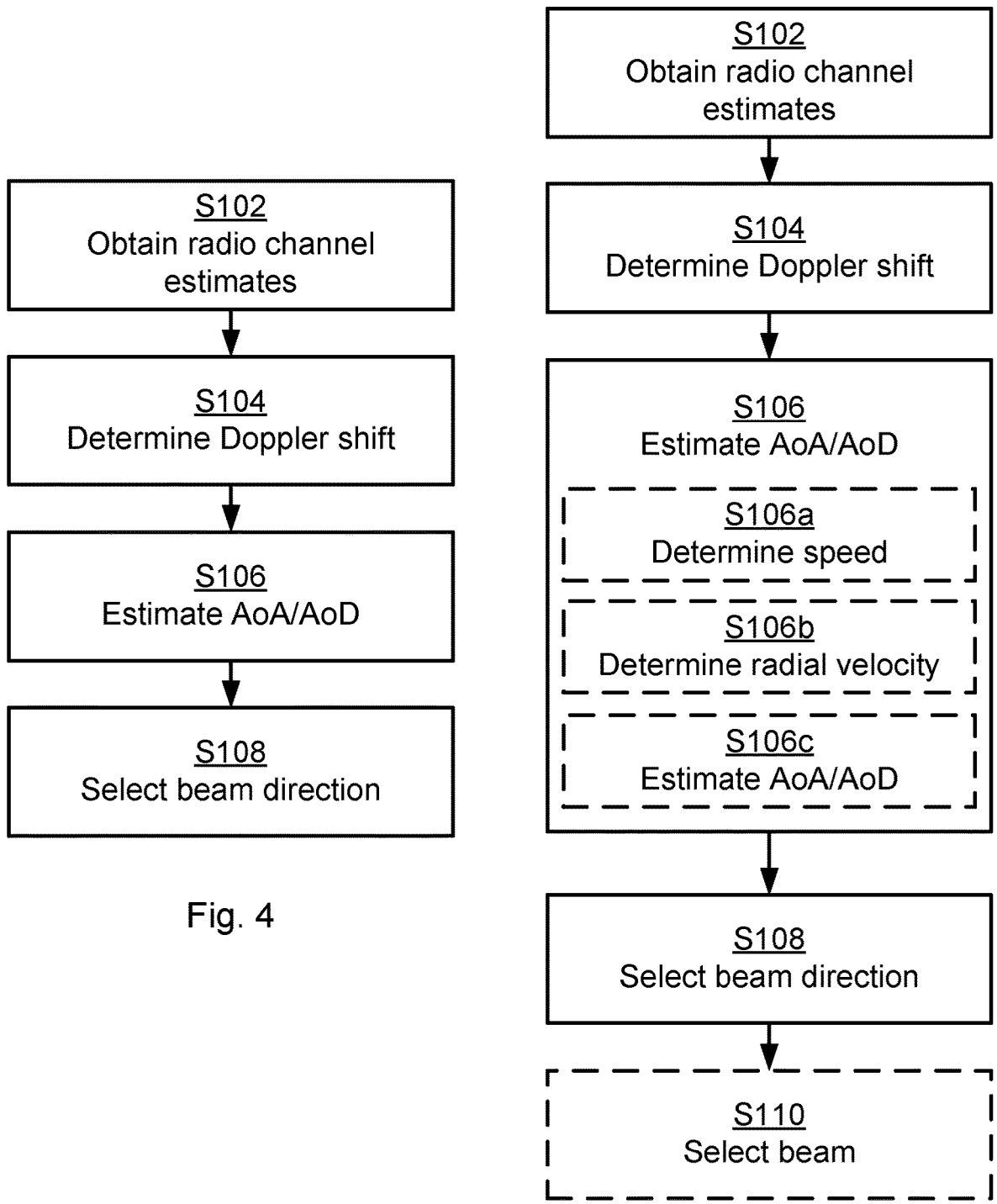
FIGS. 4 and 5 are flowcharts of methods according to embodiments.

FIGS. 4 and 5 are flow charts illustrating embodiments of methods for selecting beam direction for the radio communications device 200. The methods are performed by the radio communications device 200. The methods are advantageously provided as computer programs 820.

Reference is now made to FIG. 4 illustrating a method for selecting beam direction for the radio communications device 200 as performed by the radio communications device 200 according to an embodiment.

As disclosed above, the herein disclosed mechanisms for selecting beam direction for the radio communications device 200 are based on determining Doppler shift. The Doppler shift is based on radio channel estimates. Hence the radio communications device 200 is configured to perform step S102:

S102: The radio communications device 200 obtains radio channel estimates of a radio channel. Radio waves have been transmitted between the radio communications device 200 and the radio communications device 300 on this radio channel. The radio waves have been transmitted between the radio communications device 200 and the radio communications device 300 at an angle of arrival and departure. In this respect, the radio waves are generally transmitted in all directions (depending on properties of the transmitter of the radio waves), but only those transmitted in certain of these directions will reach the receiver. One or more of these directions correspond to the angle of arrival and departure. Further, the radio waves could either be transmitted from the radio communications device 300 to the radio communications device 200 or from the radio communications device 200 to the radio communications device 300. Still further, while the radio communications device 200 obtains the radio channel estimates, measurements of the radio channel yielding the radio channel estimates could be performed either by the radio communications device 200 or the radio communications device 300, independently of whether the radio waves were transmitted from the radio communications device 300 to the radio communications device 200 or from the radio communications device 200 to the radio communications device 300. Hence, the radio communications device 200 could obtain the radio channel estimates either by performing channel measurements, or by receiving the radio channel estimates from the radio communications device 300.

Once the radio channel estimates have been obtained the radio communications device 200 could determine the Doppler shift. Hence the radio communications device 200 is configured to perform step S104:

S104: The radio communications device 200 determines a Doppler shift from the radio channel estimates. In some aspects determining the Doppler shift involves the radio communications device 200 to perform operations, or steps, as described with reference to FIG. 2 above.

The Doppler shift is by the radio communications device 200 used to determine an angle α of arrival or departure of the radio waves. Hence the radio communications device 200 is configured to perform step S106:

S106: The radio communications device 200 estimates at least one of the angle α of arrival and departure of the radio waves based on the Doppler shift. Embodiments of different ways for the radio communications device 200 to estimates the angle α of arrival or departure of the radio waves will be provided below.

The angle α of arrival or departure is by the radio communications device 200 used to select a beam direction. Hence the radio communications device 200 is configured to perform step S108:

S108: The radio communications device 200 selects a beam direction for a signal to be transmitted between the radio communications device 200 and the radio communications device 300 over the radio channel according to the estimated angle α of arrival or departure.

In this respect the signal to be transmitted can be transmitted either by the radio communications device 200 or by the other radio communications device 300. Hence, the radio communications device 200 could be configured to select either a beam direction for a signal to be transmitted by the radio communications device 200 or a beam direction for a signal to be transmitted by the radio communications device 300.

Embodiments relating to further details of selecting beam direction for the radio communications device 200 will now be disclosed.

The angle α of arrival or departure could be defined in relation to the direction of travel of the radio communications device 200. This direction of travel could be either absolute or relative the radio communications device 300.

As disclosed above, the radio channel estimates are obtained for a radio channel on which radio waves have been transmitted between the radio communications device 200 and the radio communications device 300. Hence, the radio waves could have been transmitted by either the radio communications device 200 and received by the radio communications device 300, or transmitted by the radio communications device 300 and received by the radio communications device 200. Hence, the method could be implemented in the thus transmitting radio communications device (for example in a wireless device when the radio waves are transmitted in an uplink transmission) or the thus receiving radio communications device (for example in a network node when the radio waves are transmitted in an uplink transmission). Similarly, the estimation of the radio channel may be performed on the direct or the reverse link transmissions. In any case, the Doppler shifts for both uplink and downlink transmissions will typically reflect the angle of arrival in relation to the moving radio communications device of the link (typically the wireless device).

There could be different examples of radio waves transmitted between the radio communications device 200 and the radio communications device 300. In general terms, the radio waves represent signal waveforms. The signal waveforms in turn represent signals being transmitted between the radio communications device 200 and the radio communications device 300. Examples of such signals are control signals and data signals. The signals could comprise reference symbols or other types of symbols for which the radio channel estimates of the radio channel could be obtained.

Reference is now made to FIG. 5 illustrating methods for selecting beam direction for the radio communications device 200 as performed by the radio communications device 200 according to further embodiments. It is assumed that steps S102, S104, S106, and S108 are performed as described above with reference to FIG. 4 and a thus repeated description thereof is therefore omitted.

In some aspects the selected beam direction defines one or more beams for transmitting or receiving the signal. Hence, according to an embodiment the radio communications device 300 is configured to perform step S110:

Silo: The radio communications device 200 selects at least one beam for transmitting or receiving the signal. The at least one beam is based on the selected beam direction. For example, assuming that the radio communications device 200 has at least two beam for transmitting or receiving the signal, then that one of the at least two beams that points in a direction closest to the selected beam direction (i.e., the beam direction as selected in step S108) could be selected in step S110. Alternatively, in some aspects at least two beams are selected in step S110. This could be the case where no single beam points in the selected beam direction. Particularly, according to an embodiment at least two beams are selected, and transmission power is distributed between the at least two beams according to the estimated angle α of arrival or departure. This will allow the signal to be transmitted in several directions with a power distribution between them defined by a relative measured strength of the radio channel estimates.

Further, assuming that the radio waves are received or transmitted by at least two antenna elements of the radio communications device 200, the angle α of arrival or departure could then be estimated based on combined radio channel estimates of the radio waves received or transmitted by the at least two antenna elements. Hence, the Doppler shift could be estimated for more than one antenna element and the angle α of arrival or departure could then be estimated based on combined radio channel estimates for all antenna elements receiving or transmitting the radio waves.

Each beam could correspond to one or more antenna element of the radio communications device 200. Hence, according to an embodiment, selecting the at least one beam results in at least one antenna element being selected at the radio communications device 200.

There are different types of beam forming that can be applied at the radio communications device 200 in order to form the one or more beam for transmitting or receiving the signal. Examples for beam forming the at least one beam include, but are not limited to, grid of beam selection, pre-coding and selection of transmit antenna element based on an antenna pattern.

There may be different ways to estimate the angle α of arrival or departure. Different embodiments relating thereto will now be described in turn.

As described above, FIG. 1 shows the relation between the angle α of arrival or departure, the speed $V_r$ of the radio communications device 200 and the Doppler speed $V_d$ of the radio communications device 200. In general terms, Doppler speed will be different for each propagation path. In other words, there can be multiple Doppler speeds for a single radio communications device 200. The Doppler speed is thus more a characteristic of the radio waves than of the radio communications device 200, although the Doppler speed is scaled by the (physical) speed $V_r$ of the radio communications device 200. If the speed $V_r$ of the radio communications device 200 and the Doppler speed $V_d$ of the radio communications device 200 are known, the angle α of arrival or departure can be determined according to Eq. (2):

$$\alpha = \cos^{-1} \frac{V_d}{V_r} \qquad \text{Eq. (2)}$$

Hence, according to an embodiment the radio communications device 300 is configured to perform steps S10a, S106b, S106c in order to estimate the angle α of arrival or departure:

S106a: The radio communications device 200 determines the speed $V_r$ of the radio communications device 200.

S106b: The radio communications device 200 determines a radial velocity based on the Doppler shift. The radial velocity defining the Doppler speed $V_d$.

S106c: The radio communications device 200 estimates the angle α of arrival or departure according to Eq. (1).

S106a, S106b, S106c could be performed as part of step S106.

There could then be different ways to determine the speed $V_r$ of the radio communications device 200. According to a first embodiment the speed $V_r$ is determined from a global positioning system (GPS) or other positioning measurements. According to a second embodiment the speed $V_r$ is estimated from the Doppler spread as described above. In general terms, multiple Doppler shifts are needed in order to determine the the Doppler spread. Hence, according to an embodiment multiple Doppler shifts are determined from the radio channel estimates, where the multiple Doppler shifts define the Doppler spread of the radio channel estimates. The speed $V_r$ could then be determined based on the Doppler spread.

There could be different ways to determine the Doppler speed $V_d$. According to some aspects the Doppler speed $V_d$ for the strongest path is selected. That is, each of the multiple Doppler shifts could correspond to a path along which the radio waves are transmitted. It is assumed that the strongest path corresponds to the strongest Doppler shift. Hence, according to an embodiment the radial velocity (which defines the Doppler speed $V_d$) is based on a strongest one of the multiple Doppler shifts. Further, a candidate angle of arrival or departure could be estimated for each of the at least two of the multiple Doppler shifts, and the angle α of arrival or departure could be estimated based on the candidate angles of arrival or departure. Alternatively, in some aspects more than one strongest path can be identified including the relative strength of the paths. Hence, according to an embodiment the radial velocity is based on relative strengths of at least two of the multiple Doppler shifts. The herein disclosed method for selecting beam direction is thus not limited to selecting a single direction but can be expanded approaching eigenvalue beamforming.

The orientation of the antenna array of the radio communications device 200 may not be aligned with the direction of travel of the radio communications device 200, which could be needed to take into account for when selecting the beam direction based on the angle α of arrival or departure. The radio communications device 200 could therefore be assumed to have a structured antenna configuration, such as a linear array of antenna elements, to allow easily determined relations between beam direction and antenna element phase shifts for beam forming. In relation thereto it in some embodiments therefore is assumed that the relation between the angle of arrival and the antenna array orientation is known. Such a relation is already available when using the GPS and by means of existing sensors in common radio communications devices 200, such as so-called smartphones. The ambiguity in direction gives two alternative directions in some environments, such as a city environment where reflections mainly will appear from the sides and not from above or below. In more detail, an angle relative to the movement of the radio communications device 200 reduces the ambiguity in direction to two ambiguous alternatives instead of a "cone" of directions in three dimensions. One method to resolve the ambiguity in direction is to test both these alternatives, but there are also methods to resolve the ambiguity that involve utilizing e.g. movement of the radio communications device 200 in multiple directions over time, i.e. by testing which of the ambiguous direction that stays the same when changing the direction of movement in order to resolve the ambiguity in direction.

Figure 6:
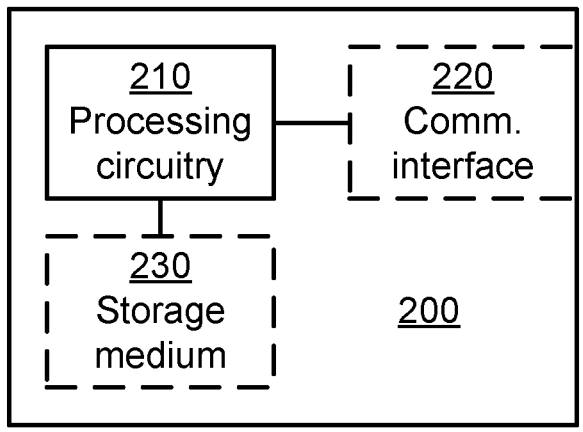
FIG. 6 is a schematic diagram showing functional units of a radio communications device according to an embodiment.

FIG. 6 schematically illustrates, in terms of a number of functional units, the components of a radio communications device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 810 (as in FIG. 8), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio communications device 200 to perform a set of operations, or steps, S102-S110, as disclosed above. For example, the storage medium 230 may store the set of operations, and the processing circuitry 210 may be configured to retrieve the set of operations from the storage medium 230 to cause the radio communications device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio communications device 200 may further comprise a communications interface 220 at least configured for communications with at least one other radio communications device 300. As such the communications interface 220 may comprise one or more transmitters and receivers, comprising analogue and digital components. The processing circuitry 210 controls the general operation of the radio communications device 200 e.g. by sending data and control signals to the communications interface 220 and the storage medium 230, by receiving data and reports from the communications interface 220, and by retrieving data and instructions from the storage medium 230. Other components, as well as the related functionality, of the radio communications device 200 are omitted in order not to obscure the concepts presented herein.

Figure 7:
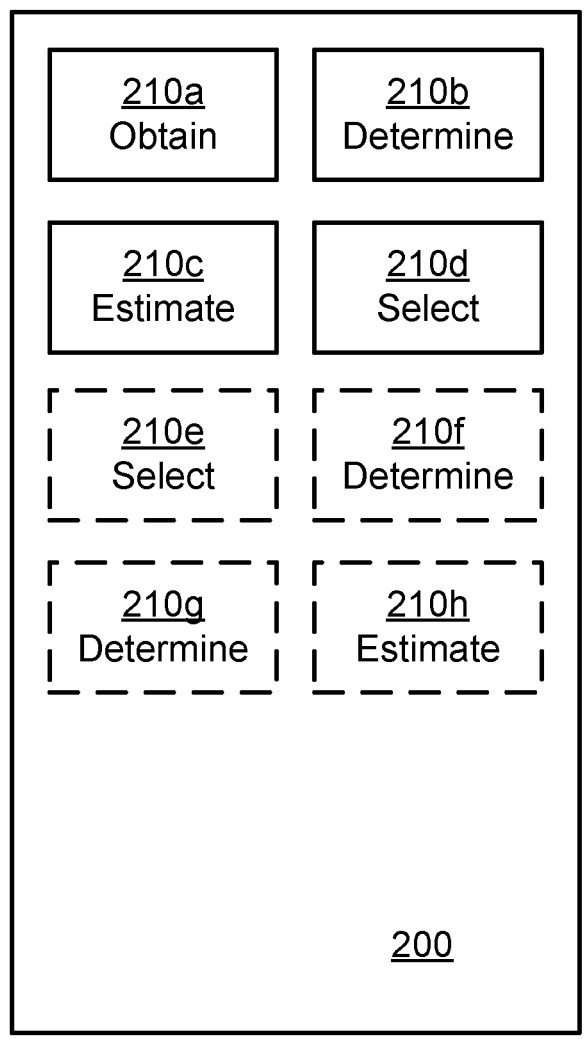
FIG. 7 is a schematic diagram showing functional modules of a radio communications device according to an embodiment.

FIG. 7 schematically illustrates, in terms of a number of functional modules, the components of a radio communications device 200 according to an embodiment. The radio communications device 200 of FIG. 7 comprises a number of functional modules; an obtain module 210a configured to perform step S102, a determine module 210b configured to perform step S104, an estimate module 210C configured to perform step S106, and a select module 210d configured to perform step S108. The radio communications device 200 of FIG. 7 may further comprises a number of optional functional modules, such as any of a select module 210e configured to perform step S110, a determine module 210f configured to perform step S106a, a determine module 210g configured to perform step S106b, and an estimate module 210h configured to perform step S106c. In general terms, each functional module 210a-210h may in one embodiment be implemented only in hardware or and in another embodiment with the help of software, i.e., the latter embodiment having computer program instructions stored on the storage medium 230 which when run on the processing circuitry makes the radio communications device 200 perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 210a-210h may be implemented by the processing circuitry 210, possibly in cooperation with functional units 220 and/or 230. The processing circuitry 210 may thus be configured to from the storage medium 230 fetch instructions as provided by a functional module 210a-210h and to execute these instructions, thereby performing any steps as disclosed herein.

Figure 8:
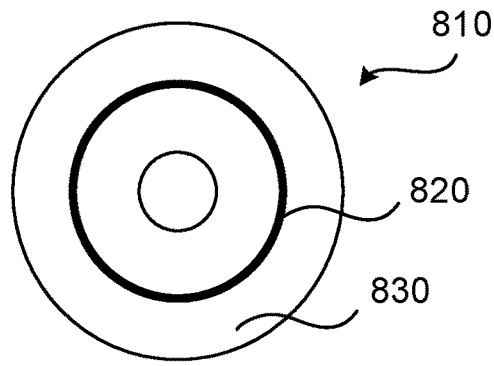
FIG. 8 shows one example of a computer program product comprising computer readable storage medium according to an embodiment.

FIG. 8 shows one example of a computer program product 810 comprising computer readable storage medium 830. On this computer readable storage medium 830, a computer program 820 can be stored, which computer program 820 can cause the processing circuitry 210 and thereto operatively coupled entities and devices, such as the communications interface 220 and the storage medium 230, to execute methods according to embodiments described herein. The computer program 820 and/or computer program product 810 may thus provide means for performing any steps as herein disclosed.

In the example of FIG. 8, the computer program product 810 is illustrated as an optical disc, such as a CD (compact disc) or a DVD (digital versatile disc) or a Blu-Ray disc. The computer program product 810 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 820 is here schematically shown as a track on the depicted optical disk, the computer program 820 can be stored in any way which is suitable for the computer program product 810.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for selecting beam direction for a radio communications device, the method being performed by the radio communications device, the method comprising:
obtaining radio channel estimates of a radio channel on which radio waves have been transmitted between the radio communications device and another radio communications device at an angle of arrival and departure;
determining a Doppler shift from the radio channel estimates;
determining speed, $V_r$, of the radio communications device;
determining a radial velocity based on the Doppler shift, the radial velocity defining a Doppler speed, $V_d$;
estimating at least one of the angle of arrival and departure of the radio waves based on the Doppler shift, wherein multiple Doppler shifts are determined from the radio channel estimates, the multiple Doppler shifts defining a Doppler spread of the radio channel estimates; and
selecting a beam direction for a signal to be transmitted between the radio communications device and the another radio communications device over the radio channel according to the estimated at least one of the angle of arrival and departure.

2. The method according to claim 1, further comprising:
selecting at least one beam for one of transmitting and receiving the signal based on the selected beam direction.

3. The method according to claim 2, wherein at least two beams are selected, and wherein transmission power is distributed between the at least two beams according to the estimated at least one of the angle of arrival and departure.

4. The method according to claim 2, wherein selecting the at least one beam results in at least one antenna element being selected at the radio communications device.

5. The method according to claim 2, wherein the at least one beam is beam formed according to one of a grid of beam selection, pre-coding and selection of transmit antenna element based on an antenna pattern.

6. The method according to claim 1, wherein the speed is determined based on information from a global positioning system.

7. The method according to claim 1, wherein the speed is determined based on a Doppler spread.

8. The method according to claim 1, wherein the radial velocity is based on a strongest one of the multiple Doppler shifts.

9. The method according to claim 8, wherein the radial velocity is based on relative strengths of at least two of the multiple Doppler shifts.

10. The method according to claim 8, wherein a candidate angle of the at least one of the arrival and departure is estimated for each of the at least two of the multiple Doppler shifts, and wherein the angle of arrival or departure is estimated based on the candidate angles of arrival or departure.

11. The method according to claim 1, wherein the multiple Doppler shifts are determined from a short-term frequency transform of a time series of the radio channel estimates.

12. The method according to claim 1, wherein each of the multiple Doppler shifts corresponds to a path along which the radio waves are transmitted.

13. The method according to claim 1, wherein the angle of arrival or departure is defined in relation to a direction of travel of the radio communications device.

14. The method according to claim 1, wherein the radio waves are one of received and transmitted by at least two antenna elements, and wherein the at least one of the angle of arrival and departure is estimated based on combined radio channel estimates of the radio waves one of received and transmitted by the at least two antenna elements.

15. A radio communications device for selecting beam direction for the radio communications device, the radio communications device comprising processing circuitry, the processing circuitry being configured to cause the radio communications device to:
 obtain radio channel estimates of a radio channel on which radio waves have been transmitted between the radio communications device and another radio communications device at an angle of arrival and departure;
 determine a Doppler shift from the radio channel estimates;
 determine speed, $V_r$, of the radio communications device;
 determine a radial velocity based on the Doppler shift, the radial velocity defining a Doppler speed, $V_d$;
 estimate at least one of the angle of arrival and departure of the radio waves based on the Doppler shift, wherein multiple Doppler shifts are determined from the radio channel estimates, the multiple Doppler shifts defining a Doppler spread of the radio channel estimates; and
 select a beam direction for a signal to be transmitted between the radio communications device and the another radio communications device over the radio channel according to the estimated at least one of the angle of arrival and departure.

16. A radio communications device for selecting beam direction for the radio communications device, the radio communications device comprising:
 processing circuitry; and
 a computer storage device storing instructions that, when executed by the processing circuitry, causes the radio communications device to:
  obtain radio channel estimates of a radio channel on which radio waves have been transmitted between the radio communications device and another radio communications device at an angle of arrival and departure;
  determine a Doppler shift from the radio channel estimates;
  determine speed, $V_r$, of the radio communications device;
  determine a radial velocity based on the Doppler shift, the radial velocity defining a Doppler speed, $V_d$;
  estimate at least one of the angle of arrival and departure of the radio waves based on the Doppler shift, wherein multiple Doppler shifts are determined from the radio channel estimates, the multiple Doppler shifts defining a Doppler spread of the radio channel estimates; and
  select a beam direction for a signal to be transmitted between the radio communications device and the another radio communications device over the radio channel according to the estimated at least one of the angle of arrival and departure.

* * * * *